United States Patent [19]

Schaffner et al.

[11] 3,911,033

[45] Oct. 7, 1975

[54] PRODUCTION OF 3,6-DIHALODIPHENYLALKANES

[75] Inventors: Ernst Schaffner, Ludwigshafen; Heinz Eilingsfeld, Frankenthal; Manfred Patsch, Ludwigshafen, all of Germany

[73] Assignee: BASF Aktiengesellschaft, Ludwigshafen (Rhine), Germany

[22] Filed: Nov. 15, 1973

[21] Appl. No.: 416,258

[30] Foreign Application Priority Data
Nov. 18, 1972   Germany............................ 2256661

[52] U.S. Cl.......... 260/649 R; 260/465 G; 260/469; 260/473 A; 260/475 R; 260/611 A; 260/618 D; 260/646
[51] Int. Cl.$^2$.......................................... C07C 25/18
[58] Field of Search............ 260/465 G, 469, 475 R, 260/473 A, 611 A, 618 D, 646, 649 R

[56] References Cited
UNITED STATES PATENTS
3,326,987   6/1967   Armendt et al................ 260/649 R

*Primary Examiner*—D. Horwitz
*Attorney, Agent, or Firm*—Johnston, Keil, Thompson & Shurtleff

[57] ABSTRACT

The production of 3,6-dihalodiphenylalkanes by reaction of a diphenylalkane with a halogen and the novel 3,6-dihalodiphenylalkanes themselves. The new compounds which can be prepared according to the process of the invention may be used as dispersing agents in dye/styrene mixtures and also as dyeing auxiliaries. They are also valuable starting materials for the production of dyes and pesticides.

11 Claims, No Drawings

PRODUCTION OF 3,6-DIHALODIPHENYLALKANES

The invention relates to a process for the production of 3,6-dihalodiphenylalkanes by reaction of diphenylalkanes with halogen.

It is known from Houben-Weyl, "Methoden der organischen Chemie", volume V/3, pages 12 et seq. and 511 et seq., and volume V/4, pages 13 et seq. and 517 et seq., that there are many methods of halogenating benzene derivatives in the nucleus. In the case of systems having two phenyl nuclei which are connected together direct or by way of alkyl radicals, halogenation has not been described or it gives inconsistent results, for example halogenation of the alkyl radical, mixtures of differently halogenated components or changes in the basic substance. Thus in Rodd, "Chemistry of Carbon Compounds" (Elsevier, N.Y. 1956), volume IIIB, pages 1055 to 1065 it is recommended that diphenylmethanes and benzophenones halogenated in the nucleus should not be prepared by direct halogenation but by other methods. When diphenylmethane is heated with phosphorus pentachloride it gives benzyl trichloride and benzophenone dichloride (Rodd, loc.-cit., page 1058); the combination of the halogen is described as labile. Direct chlorination or bromination of diphenyl gives 4-, 4,4'-, 2-, and 2,4'-halogen derivatives. Chlorination of 1,1,1,-trichloro-2,2-bis-p-chlorophenylethane in carbon tetrachloride in the presence of phosphorus trichloride in sunlight (Rodd, loc.-cit., page 1119 ) gives the 1,1,1,2-tetrachloro compound. The solvent may also play an important part; thus bromination of 1,2-diphenylethane in a solvent which does not contain any hydroxyl groups, for example carbon tetrachloride, gives the 1,2-dibromo compound; reaction in glacial acetic acid gives a mixture of 1,2,p,p'-and 1,2,o,p'- tetrabromo-1,2-diphenylethane (Rodd, loc.cit., page 1136 ). Chloroalkyl groups may be eliminated in the nuclear chlorination, thus for example 3,4-dichlorobenzotrichloride is formed from 2-chloro-1,4-bis-trichloromethylbenzene (Houben-Weyl, loc.cit., volume V/3, page 666 ). In the chlorination of o-methylbiphenyl and o-methylbenzophenone systems cyclization may occur, for example to form tetrachlorofluorenacene compounds or dichloroanthrone compounds.

Halogenation of diphenylalkanes bearing three alkyl groups as substituents in the phenyl nucleus has not hitherto been described This invention has for its object a new process for the production of 3,6-dihalodiphenylalkanes selectively in good yields and high purity.

Another object of this invention are the new 3,6-dihalodiphenylalkanes.

We have now found that a 3,6-dihalodiphenylalkane of the formula:

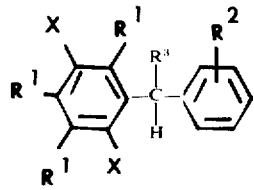

in which the individual radicals $R^1$ and $R^3$ may be idential or different and each is an aliphatic radical; $R^2$ and the individual radicals X may be identical or different and each is a halogen atom; $R^2$ and/or $R^3$ may also be a hydrogen atom, is advantageously obtained by reacting a diphenylalkane of the formula

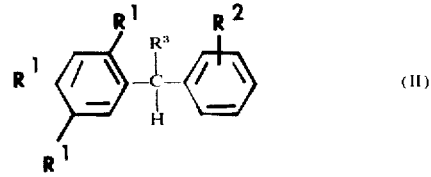

in which $R^1$, $R^2$ and $R^3$ have the above meaning with a halogen or the formula:

$$X_2 \quad (III)$$

in which X has the above meaning.

If the starting materials are 1,1-(2',4',5'-trimethyl)-diphenylethane and chlorine the reaction may be represented by the following equation:

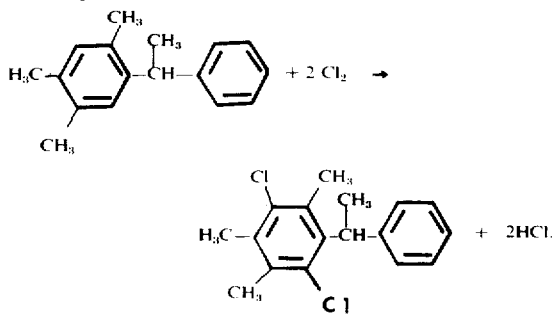

Having regard to the prior art the process according to the invention surprisingly gives 3,6-dihalodiphenylalkanes selectively in a good yield and purity in a simple way. Formation of numerous isomeric monohalo, dihalo, trihalo and higher polyhalo compounds bearing halogen substituents on both nuclei, or halogenation of the alkyl or alkylene groups present as substituents on the nuclei is not observed to any significant extent. Similarly secondary reactions such as the elimination of alkyl groups, cyclization, fission of the starting material for example into benzene and styrene compounds do not play any significant part. A large number of both polar and nonpolar solvents may be used. None of these advantageous results could have been expected with a knowledge of the prior art.

Preferred starting materials (II) and (III) and consequently preferred end products (I) are those in whose formulae the individual radicals $R^1$ and $R^3$ may be identical or different and each is an alkyl of one to seven and preferably of one to four carbon atoms, particularly methyl, ethyl or isopropyl, $R^2$ and the individual radicals X may be identical or different and each is iodine, bromine or particularly chlorine, and $R^2$ and/or $R^3$ moreover may be hydrogen. The alkyl radicals may be linear or branched and may bear groups and/or atoms which are inert under the reaction conditions, for example alkoxy of one to three carbon atoms, carbalkoxy of two to four carbon atoms, chloro, bromo, hydroxy, cyano or nitro as substituents.

Examples of starting materials (II) are as follows:
2',4',5'-trimethyl-1,1-diphenylethane,
2',4',5'-triethyl-1,1-diphenylethane,
2',4',5'-triisopropyl-1,1-diphenylethane,
2',4',5'-tri-n-propyl-1,1-diphenylethane, 2',4',5'-trichloromethyl-1,1-diphenylethane,
2'-methyl-4',5'-diethyl-1,1-diphenylethane,
2',4'-dimethyl-5'-ethyl-1,1-diphenylethane,
2',4',5'-tri-(dichloro)-methyl-1,1-diphenylethane,
2',4',5'-trihydroxymethyl-1,1-diphenylethane,
2',4',5'-tribromomethyl-1,1-diphenylethane,
2',4',5'-triethoxyethyl-1,1-diphenylethane,
2',4',5'-triethoxymethyl-1,1-diphenylethane,
2',4',5'-tricarbomethoxymethyl-1,1-diphenylethane,
2',4',5'-tricyanomethyl-1,1-diphenylethane,
2',4',5'-tri-(1''',2'''-dichloro)-ethyl-(1''')-1,1-diphenylethane;

compounds as above which bear chloro or bromo as a substituent in the o-position, m-position or p-position to the ethane grouping; and 1,1-diphenylmethanes, 1,1-diphenylpropanes, 1,1-diphenylbutanes, 1,1-diphenylhexanes and 1,1-diphynlisopropanes corresponding to the above 1,1-diphenylethanes.

The reaction is generally carried out at a temperature of from −20° to +200°C, conveniently from −10° to +100°C and preferably from 0° to 30°C, at atmospheric or superatmospheric pressure, continuously or batchwise. As a rule, solvents which are inert under the reaction conditions are used to dissolve or suspend the starting materials and reaction mixture. Particularly suitable solvents include water and organic solvents having a boiling point at atmospheric pressure or at a pressure of up to 10 atmospheres at a temperature of more than 100°C, preferably at atmospheric pressure at from 60° to 190°C. Examples of suitable solvents are as follows:

water; aromatic hydrocarbons, for example benzene, toluene, ethylbenzene, isopropylbenzene, p-dichlorobenzene; halohydrocarbons, particularly chlorohydrocarbons, for example tetrachloroethylene, tetrachloroethane, carbon tetrachloride, chloroform, trichloroethane, trichloroethylene, pentachloroethane, cis-dichloroethylene, bromobenzene, 1,2-dichloroethane, methylene chloride, 1,1-dichloroethane, 1,2-cis-dichloroethylene, n-butyl chloride, 2-butyl chloride, 3-butyl chloride, isobutyl chloride, chlorobenzene, bromobenzene, iodobenzene, o-dichlorobenzene, m-dichlorobenzene, o-dibromobenzene, m-dibromobenzene, o-chlorotoluene, m-chlorotoluene, p-chlorotoluene, 1,2,4-trichlorobenzene, 1,10-dibromodecane, 1,4-dibromobutane; alcohols such as ethanol, n-butanol, isobutanol, tert.-butanol, cyclohexanol, propanol and particularly methanol; sulfoxides such as dimethylsulfoxide; ether, diisoamyl ether, diisopropyl ether, anisol, phenetol, cyclohexylmethyl ether, diethyl ether, tetrahydrofurane, thioanisol, β,β'-dichlorodiethyl ether; esters such as methyl acetate, methyl benzoate, phenyl acetate; nitrohydrocarbons such as nitromethane, nitroethane, nitrobenzene, o-chloronitrobenzene, m-chloronitrobenzene, p-chloronitrobenzene, o-nitrotoluene; nitriles such acetonitrile, benzonitrile, m-chlorobenzonitrile; aliphatic or cycloaliphatic hydrocarbons, for example hexane, heptane, nonane, o-cymene, m-cymene, p-cymene, gasoline fractions within the said boiling point range, cyclohexane, methylcyclohexane, petroleum ether, decahydronaphthalene, ligroin, 2,2,4-trimethylpentane, 2,2,3-trimethylpentane, 2,3,3-trimethylpentane, octane; inorganic or organic acids, for example acetic acid, sulfuric acid, phosphoric acid, boric acid, chloroacetic acid, oxalic acid, formic acid, adipic acid, chlorosulfonic acid, methylsulfonic acid, bromoacetic acid, iodoacetic acid; and mixtures of these. It is convenient to use the solvent in an amount of from 5 to 1000% and preferably from 5 to 50% by weight based on starting material (II).

The halogen, preferably bromine, iodine and particularly chlorine, may be used in the elementary form or in the form of an agent which yields halogen under the reaction conditions (halogenating agent). The reaction may be carried out with elementary halogen in the absence or presence of a halogenation catalyst (halogen transferrer). The following halogenation catalysts are suitable: chlorides or other halides of the platinum metals, for example rhodium(III) chloride or iridium(III) chloride; metals such as iron aluminum, antimony or molybdenum and the corresponding chlorides or other halides such as iron(III) chloride, aluminum chloride, aluminum bromide, antimony(III) chloride, antimony(V) chloride, antimony(V) sulfide, molybdenum(V) chloride, tin(IV) chloride, nickel(II) chloride, mercury(II) chloride, thorium chloride, manganese(II) chloride, zinc chloride; a second halogen in the case of chlorinations, for example iodine or iodine(I) chloride or iodine(I) bromide; sulfur and sulfur-halogen compounds, for example sulfuryl chloride; phosphorus and phosphorus-halogen compounds, for example phosphorus trichloride; hydrogen bromide or iodine bromide in the case of brominations; activated carbon; or appropriate mixtures of catalysts such as sulfur and antimony(III) chloride, antimony(V) chloride and iodine in the case of chlorinations. The halogenation catalysts may if desired be used with a carrier, for example thorium chloride on pumice, manganese(II) chloride on activated alumina or iron chloride on activated carbon. It is preferred to use elementary halogen in an amount of from 1 to 10 and advantageously from 1 to 5 moles and the halogenation catalyst in an amount of from 0.01 to 1% and advantageously from 0.1 to 0.5% by weight based on starting material (II).

Sulfur-halogen compounds such as sulfur dichloride or sulfuryl chloride; dichlorine monoxide in the form for example of a mixture of chlorine, silver nitrate and sulfuric acid, are suitable as halogenating agents.

Halogenation catalysts may be used with the halogenating agents, for example sulfuryl chloride with disulfur dichloride and aluminum chloride; iodine chloride and iron(III) chloride. The halogenating agent is preferably used in an amount of from 1 to 20 and advantageously in an amount of from 1 to 5 moles and the halogenation catalyst in an amount of from 0.01 to 1 and advantageously from 0.1 to 0.5% by weight based on starting material (II).

The reaction may be carried out as follows. A mixture of starting materials (II) and (III) with or without solvent and catalyst is kept at the reaction temperature for ½ hour to 8 hours. The end product is then separated from the reaction mixture by a conventional method, for example by distillation.

The new compounds which can be prepared according to the process of the invention may be used as dispersing agents in mixtures of dye and styrene and as dyeing auxiliaries and are valuable starting materials for the production of dyes and pesticides. Thus they may be reacted by oxidizing cyclization according to German Pat. No. 2,256,663 to form anthraquinone-2,3-dicarboxylic acids which are intermediates for wetfast, washfast and lightfast disperse dyes on polyester fibers and also vat dyes.

The following Examples illustrate the invention. The parts indicated are parts by weight.

EXAMPLE 1

22.4 parts of 1,1-(2',4',5'-trimethyl)-diphenylethane and 0.2 part of iodine are dissolved in 150 parts of carbon tetrachloride. 15 parts of chlorine is passed in at 0° to 5°C during 2 hours. The whole is stirred for another 30 minutes at 5°C, shaken with 100 parts of a 1% by weight solution of sodium thiosulfate and concentrated. In a distillation 18 parts (61.4% of theory) of 1,-1-(2',4',5'-trimethyl-3',6'-dichloro)-diphenylethane is obtained at from 168° to 172°C at 0.15 mmHg. It has a melting point of 56° to 60°C.

EXAMPLE 2

30 parts of chlorine is passed during three hours at 0° to 5°C into a solution of 44.8 parts of 1,1-(2',4',5'-trimethyl)-diphenylethane in 150 parts of glacial acetic acid. The reaction mixture is poured into water and the whole is extracted with carbon tetrachloride. 35 parts of 1,1-(2',4',5'-trimethyl-3',6'-dichloro)-diphenylethane is obtained by distillation at 174° to 176°C at 0.2 mmHg; this is 59.7% of theory.

EXAMPLE 3

30 parts of sulfuryl chloride is added at 60° to 70°C over a period of three hours to a solution of 22.4 parts of 1,1-(2',4',5'-trimethyl)-diphenylethane in 100 parts of glacial acetic acid. The mixture is poured onto ice-water and extracted with carbon tetrachloride. 15 parts (51.2% of theory) of 1,1-(2',4',5'-trimethyl-3',6'-dichloro)-diphenylethane is isolated by distillation at 174° to 176°C at 0.2 mmHg.

EXAMPLE 4

25 parts of chlorine is passed over a period of 3 hours at −15°C into a mixture of 33.6 parts of 1,1-(2',4',5'-trimethyl)-diphenylethane, 150 parts of 1,1,2-trichloroethane and 0.5 part of activated carbon. The mixture is stirred for another hour at −10° to −5°C and washed with 5% by weight caustic soda solution. 26 parts (59.1% of theory) of 1,1-(2',4',5'-trimethyl-3',6'-dichloro)-diphenylethane is isolated by distillation at 180° to 188°C at 0.3 mmHg.

EXAMPLE 5

80 parts of bromine is added during a period of one hour at 15° to 20°C to a solution of 44.8 parts of 1,1-(2',4',5'-trimethyl)-diphenylethane, 150 parts of glacial acetic acid and 0.2 part of antimony pentachloride. The mixture is stirred for another 2 hours at 15° to 20°C, three hours at 40° to 50°C and another 2 hours at 80°C, poured onto ice and extracted with carbon tetrachloride. 42 parts (55.0% of theory) of 1,1-(2',4',5'-trimethyl-3',6'-dibromo)-diphenylethane is isolated by distillation at 180° to 188°C at 0.1 mmHg.

EXAMPLE 6

32 parts of chlorine is passed over a period of 3 hours at 0° to 5°C into a solution of 42 parts of 2,4,5-trimethyldiphenylmethane, 200 parts of trichloroethylene and 0.5 part of iodine. The reaction mixture is stirred for another hour at 0° to 5°C and poured onto water and the organic phase is separated. 45 parts (80.3% of theory) of 2,4,5-trimethyl-3,6-dichlorodiphenylmethane (melting point: 80° to 82°C) is isolated by distillation at 175° to 180°C at 0.2 mmHg.

We claim:

1. A process for the production of 3,6dihalodiphenylalkanes of the formula:

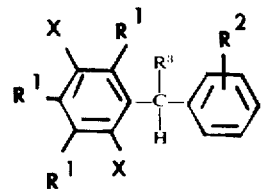

in which:

each $R^1$ and $R^3$ is alkyl of one to seven carbon atoms or said alkyl bearing substituents which are inert under the reaction conditions of the process; each $R^2$ and X is chlorine, bromine or iodine; with the proviso that $R^2$ and $R^3$ may also be hydrogen, which process comprises:

reacting a diphenylalkane of the formula

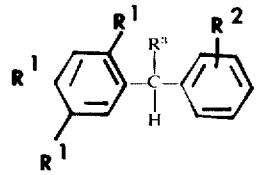

with molecular halogen of the formula $X_2$, $R^1$, $R^2$, $R^3$ and X having the above meanings.

2. A 3,6-dihalodiphenylalkane of the formula

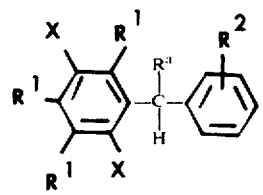

wherein:

each $R^1$ and $R^3$ is alkyl of one to seven carbon atoms or said alkyl substituted by alkoxy of 1 to 3 carbon atoms, carbalkoxy of 2 to 4 carbon atoms, chloro, bromo, hydroxy, cyano or nitro; each $R^2$ and X is chlorine, bromine or iodine; with the proviso that $R^2$ and $R^3$ may also be hydrogen.

3. 2,4,5-trimethyl-3,6-dihalodiphenylmethane.

4. 1,1-(2',4',5'-trimethyl-3',6'-dihalo)-diphenylethane.

5. A process as claimed in claim 1 carried out at a temperature of from −20° to +200°C.

6. A process as claimed in claim 1 carried out at a temperature of from 0° to 30°C.

7. A process as claimed in claim 1 carried out in the presence of a solvent which is inert under the reaction conditions.

8. A process as claimed in claim 1 carried out with from 1 to 10 moles of elementary halogen per mole of starting material (II).

9. A process as claimed in claim 1 carried out with from 0.01 to 1% by weight, based on starting material (II), of a halogenation catalyst.

10. A process as claimed in claim 1 carried out with from 1 to 20 moles of halogenating agent per mole of starting material (II).

11. A process as claimed in claim 1 carried out with a chloride of a platinum metal, iron, aluminum, antimony, molybdenum, iron(III) chloride, aluminum chloride, aluminum bromide, antimony(III) chloride, antimony(V) chloride, antimony(V) sulfide, molybdenum(V) chloride, tin(IV) chloride, nickel(II) chloride, mercury(II) chloride, throium chloride, manganese(II) chloride, zinc chloride, iodine, iodine(I) chloride, iodine(I) bromide, sulfur, sulfuryl chloride, phosphorus, phosphorus trichloride, hydrogen bromide, iodine bromide, or activated carbon.

* * * * *

UNITED STATES PATENT AND TRADEMARK OFFICE
CERTIFICATE OF CORRECTION

PATENT NO. : 3,911,033
DATED : October 7, 1975
INVENTOR(S) : SCHAFFNER et al

It is certified that error appears in the above-identified patent and that said Letters Patent are hereby corrected as shown below:

In Column 2, the structural formula in lines 5-10, delete " 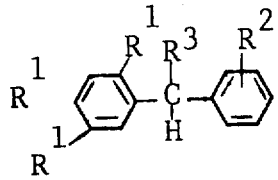 " and substitute -- 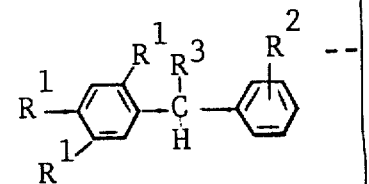 --

In Column 6, the structural formula in lines 30-35, delete " 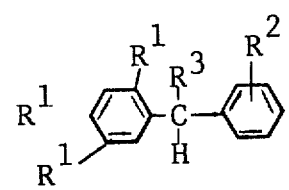 " and substitute -- 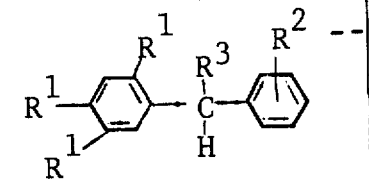 --

Signed and Sealed this

Fourteenth Day of September 1976

[SEAL]

Attest:

RUTH C. MASON
Attesting Officer

C. MARSHALL DANN
Commissioner of Patents and Trademarks